United States Patent
Tu, Jr. et al.

(10) Patent No.: US 10,317,080 B2
(45) Date of Patent: Jun. 11, 2019

(54) CO-SWIRL ORIENTATION OF COMBUSTOR EFFUSION PASSAGES FOR GAS TURBINE ENGINE COMBUSTOR

(71) Applicant: United Technologies Corporation, Farmington, CT (US)

(72) Inventors: John S. Tu, Jr., West Hartford, CT (US); Timothy S. Snyder, Glastonbury, CT (US); James B. Hoke, Tolland, CT (US); James P. Bangerter, Manchester, CT (US); Dennis J. Duhamel, Oakdale, CT (US); David A. Burns, St. Clair Shores, MI (US)

(73) Assignee: United Technologies Corporation, Farmington, CT (US)

( * ) Notice: Subject to any disclaimer, the term of this patent is extended or adjusted under 35 U.S.C. 154(b) by 391 days.

(21) Appl. No.: 15/037,484

(22) PCT Filed: Dec. 3, 2014

(86) PCT No.: PCT/US2014/068377
§ 371 (c)(1),
(2) Date: May 18, 2016

(87) PCT Pub. No.: WO2015/126501
PCT Pub. Date: Aug. 27, 2015

(65) Prior Publication Data
US 2016/0281988 A1    Sep. 29, 2016

Related U.S. Application Data

(60) Provisional application No. 61/912,865, filed on Dec. 6, 2013.

(51) Int. Cl.
*F23R 3/00* (2006.01)
*F23R 3/06* (2006.01)

(52) U.S. Cl.
CPC ............ *F23R 3/06* (2013.01); *F23R 3/002* (2013.01); *F23R 2900/03041* (2013.01); *F23R 2900/03044* (2013.01); *Y02T 50/675* (2013.01)

(58) Field of Classification Search
CPC .. F23R 3/06; F23R 3/002; F23R 2900/03041; F23R 2900/04044; Y02T 50/675
(Continued)

(56) References Cited

U.S. PATENT DOCUMENTS 6,145,319 A   11/2000   Burns et al.
6,408,629 B1   6/2002   Harris et al.
(Continued)

OTHER PUBLICATIONS

EP search report for EP14883404.7 dated Oct. 27, 2016.

*Primary Examiner* — J. Todd Newton
(74) *Attorney, Agent, or Firm* — O'Shea Getz P.C.

(57) ABSTRACT

A liner panel for use in a combustor for a gas turbine engine includes a forward region including a multiple of effusion passages each directed at an orientation consistent with a local swirl direction of combustion gases. Another liner panel for use in a combustor for a gas turbine engine includes a forward region forward of a dilution passage and an aft region aft of the forward region. The forward region includes a multiple of effusion passages each directed generally circumferentially. The aft region includes a multiple of effusion passages each directed at an orientation generally axially. A method of cooling a wall assembly within a combustor of a gas turbine engine includes orienting a multiple of effusion passages within a forward region consistent with a local swirl direction of combustion gases.

7 Claims, 8 Drawing Sheets

(58) Field of Classification Search
USPC .......................................................... 60/782
See application file for complete search history.

(56) References Cited

U.S. PATENT DOCUMENTS

| | | |
|---|---|---|
| 6,513,331 B1 | 2/2003 | Brown et al. |
| 6,620,457 B2 | 9/2003 | Farmer et al. |
| 6,655,149 B2 | 12/2003 | Farmer et al. |
| 7,093,439 B2 | 8/2006 | Pacheco-Tougas et al. |
| 7,124,588 B2 | 10/2006 | Gerendas et al. |
| 7,146,816 B2 | 12/2006 | Anderson et al. |
| 7,155,913 B2 | 1/2007 | Beule et al. |
| 7,216,485 B2 | 5/2007 | Caldwell et al. |
| 7,464,554 B2 | 12/2008 | Cheung et al. |
| 7,546,737 B2 | 6/2009 | Schumacher et al. |
| 7,614,235 B2 | 11/2009 | Burd et al. |
| 7,631,502 B2 | 12/2009 | Burd et al. |
| 7,669,422 B2 | 3/2010 | Suleiman et al. |
| 7,748,222 B2 | 7/2010 | Bernier et al. |
| 7,926,284 B2 | 4/2011 | Zupanc et al. |
| 2003/0167772 A1 | 9/2003 | Farmer et al. |
| 2003/0213250 A1* | 11/2003 | Pacheco-Tougas ..... F23R 3/002 60/752 |
| 2007/0130953 A1* | 6/2007 | Burd .......................... F23R 3/06 60/772 |
| 2009/0084110 A1 | 4/2009 | Dudebout et al. |
| 2011/0023495 A1* | 2/2011 | Bronson .................. F23R 3/06 60/752 |
| 2016/0025342 A1* | 1/2016 | Erbas-Sen ............... F23R 3/005 60/772 |
| 2016/0281988 A1* | 9/2016 | Tu, Jr. ..................... F23R 3/002 |

* cited by examiner

CO-SWIRL ORIENTATION OF COMBUSTOR EFFUSION PASSAGES FOR GAS TURBINE ENGINE COMBUSTOR

CROSS-REFERENCE TO RELATED APPLICATION

This application claims priority to PCT Patent Application No. PCT/US14/68377 filed Dec. 3, 2014, which claims priority to U.S. Patent Application No. 61/912,865 filed Dec. 6, 2013, which are hereby incorporated herein by reference in their entireties.

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Among the engine components, relatively high temperatures are observed in the combustor section such that cooling airflow is provided to meet desired service life requirements. The combustor section typically includes a combustion chamber formed by inner and outer wall assemblies. Each wall assembly includes a support shell lined with heat shields often referred to as liner panels. In certain combustion architectures, dilution passages direct airflow to condition air within the combustion chamber.

In addition to the dilution passages, the shells may have relatively small air impingement passages to direct cooling air to impingement cavities between the support shell and the liner panels. This cooling air exits numerous effusion passages through the liner panels to effusion cool the passages and film cool a hot side of the liner panels to reduce direct exposure to the combustion gases. To facilitate cooling efficiency, each effusion passage is strategically located and formed with compound angles, e.g., a spanwise clock angle, i.e., azimuth and a surface angle, i.e., elevation. With lower emission and higher combustor operational temperature requirements, benefits accrue in response to efficient utilization of cooling air.

SUMMARY

A liner panel for use in a combustor for a gas turbine engine, according to one disclosed non-limiting embodiment of the present disclosure, includes a forward region which includes a multiple of effusion passages. Each of these effusion passages is directed at an orientation substantially aligned with a local swirl direction of combustion gases.

In a further embodiment of the present disclosure, the orientation is generally parallel to a forward circumferential rail.

In a further embodiment of any of the foregoing embodiments of the present disclosure, the forward region is forward of a multiple of dilution passages along a circumferential line.

In a further embodiment of any of the foregoing embodiments of the present disclosure, an aft region is included aft of the forward region. The aft region includes a multiple of effusion passages each directed at an orientation transverse to the multiple of effusion passages within the forward region.

In a further embodiment of any of the foregoing embodiments of the present disclosure, the orientation of the multiple of effusion passages within the aft region is generally perpendicular to a forward circumferential rail.

In a further embodiment of any of the foregoing embodiments of the present disclosure, the aft region extends forward of the dilution passages.

In a further embodiment of any of the foregoing embodiments of the present disclosure, the aft region extends forward of the dilution passages by about 50%-100% a diameter of the dilution passages.

A liner panel for use in a combustor for a gas turbine engine, according to another disclosed non-limiting embodiment of the present disclosure, includes a forward region forward of a dilution passage and an aft region aft of the forward region. The forward region includes a multiple of effusion passages each directed generally circumferentially. The aft region includes a multiple of effusion passages each directed at an orientation generally axially.

In a further embodiment of any of the foregoing embodiments of the present disclosure, the orientation of the multiple of effusion passages within the forward region is consistent with a local swirl direction of combustion gases.

In a further embodiment of any of the foregoing embodiments of the present disclosure, the aft region extends forward of the dilution passages by about 50%-100% a diameter of the dilution passages.

In a further embodiment of any of the foregoing embodiments of the present disclosure, the orientation of the multiple of effusion passages within the forward region is generally parallel to a forward circumferential rail. The orientation of the multiple of effusion passages within the aft region is generally perpendicular to the forward circumferential rail.

In a further embodiment of any of the foregoing embodiments of the present disclosure, an aft circumferential rail is included axially downstream of the forward circumferential rail. First and second axial rails are included that connect the aft circumferential rail with the forward circumferential rail.

In a further embodiment of any of the foregoing embodiments of the present disclosure, the orientation of at least one of the multiple of effusion passages is directed toward the one of the first and second axial rails.

In a further embodiment of any of the foregoing embodiments of the present disclosure, at least one of the multiple of effusion passages within the aft region is a singleton.

In a further embodiment of any of the foregoing embodiments of the present disclosure, at least one of the multiple of effusion passages within the forward region is a singleton.

A method of cooling a wall assembly within a combustor of a gas turbine engine, according to another disclosed non-limiting embodiment of the present disclosure, includes orienting a multiple of effusion passages within a forward region consistent with a local swirl direction of combustion gases.

In a further embodiment of any of the foregoing embodiments of the present disclosure, the method also includes locating the forward region forward of a multiple of dilution passages.

In a further embodiment of any of the foregoing embodiments of the present disclosure, the method also includes orienting a multiple of effusion passages within an aft region aft of the forward region transverse to the multiple of dilution passages within the forward region.

In a further embodiment of any of the foregoing embodiments of the present disclosure, the method also includes defining the aft region forward of the dilution passages by about 50%-100% a diameter of at least one of the multiple of dilution passages.

In a further embodiment of any of the foregoing embodiments of the present disclosure, the method also includes defining the multiple of dilution passages along a circumferential line and orienting the multiple of effusion passages within the forward region generally parallel to the circumferential line.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment(s). The drawings that accompany the detailed description can be briefly described as follows.

DETAILED DESCRIPTION

Figure 1:
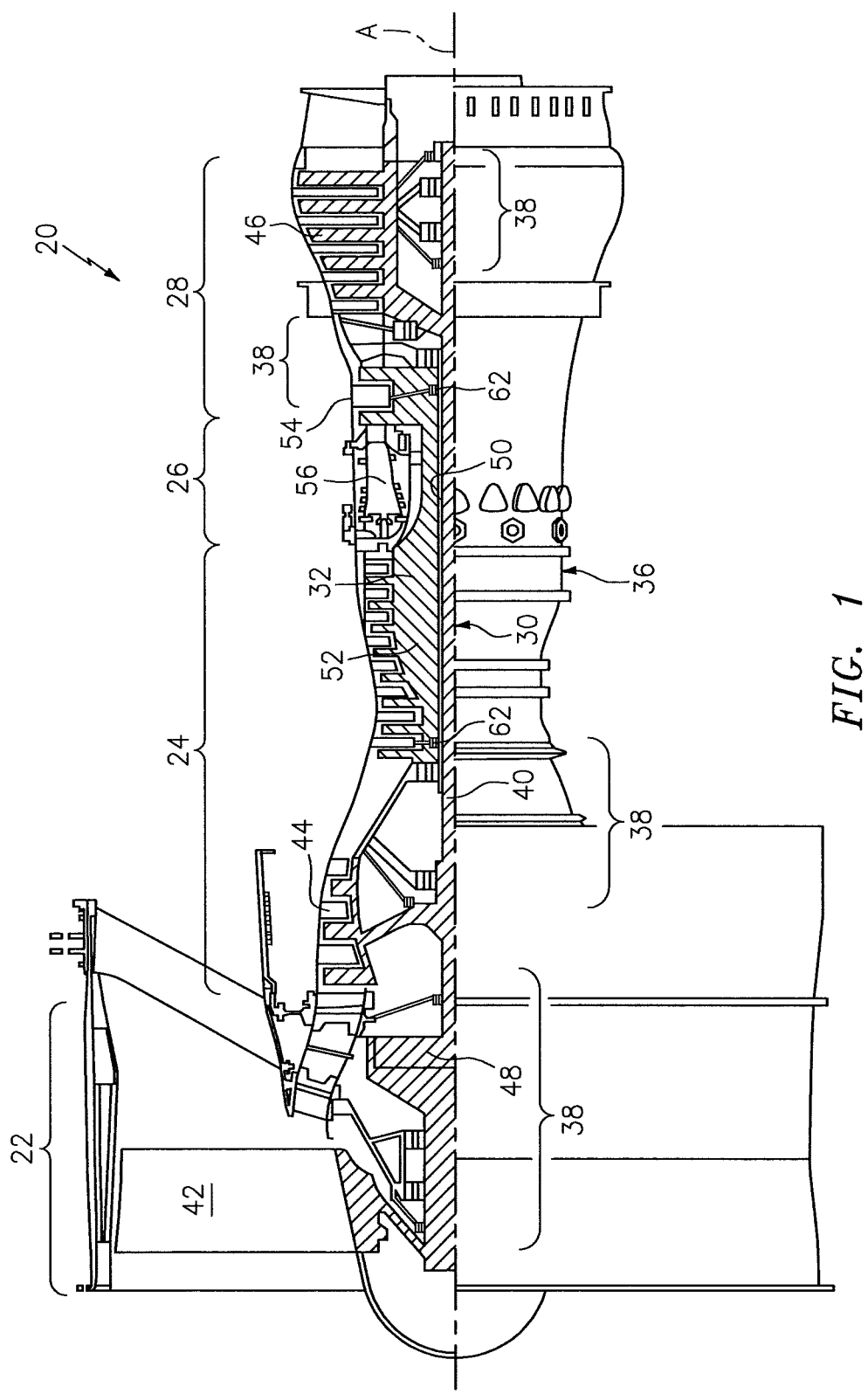
FIG. 1 is a schematic cross-section of an example gas turbine engine architecture.
Figure 2:
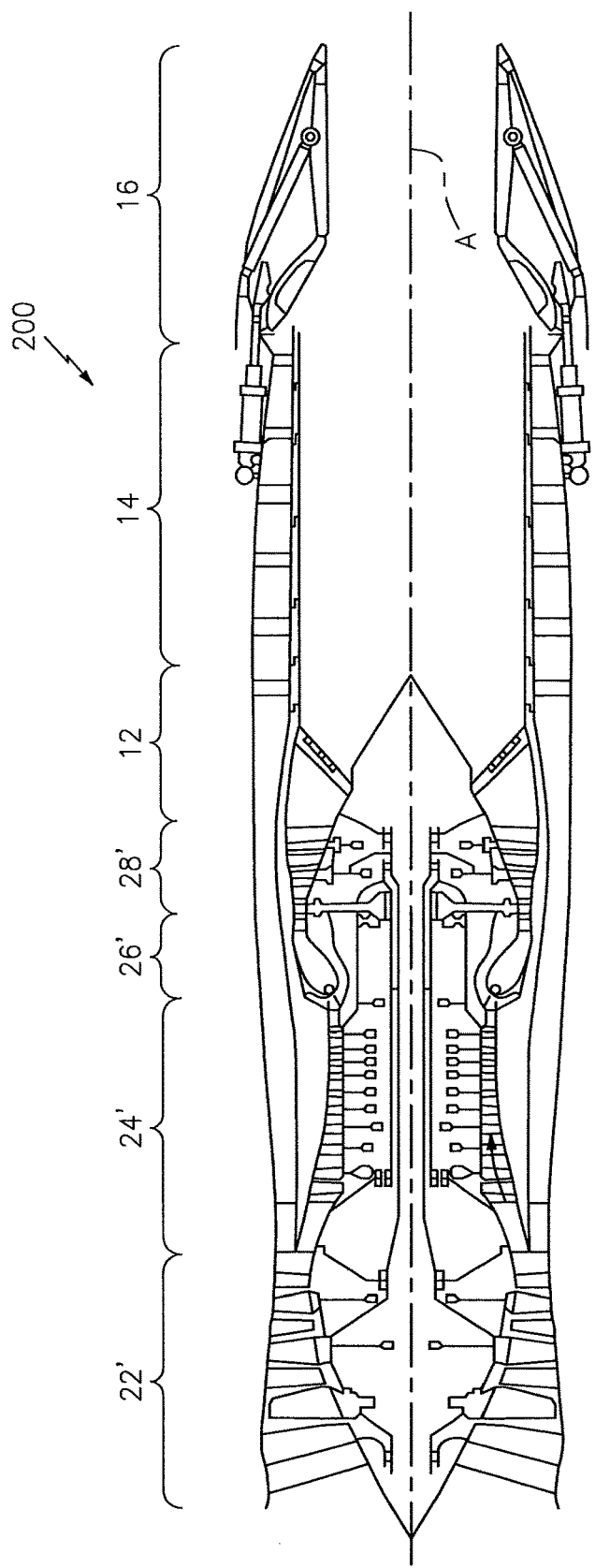
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Referring to FIG. 2, alternative engine architectures 200 might include an augmentor section 12, an exhaust duct section 14 and a nozzle section 16 in addition to the fan section 22', compressor section 24', combustor section 26' and turbine section 28' among other systems or features. Referring again to FIG. 1, the fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by the bearing structures 38 within the static structure 36.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 3:
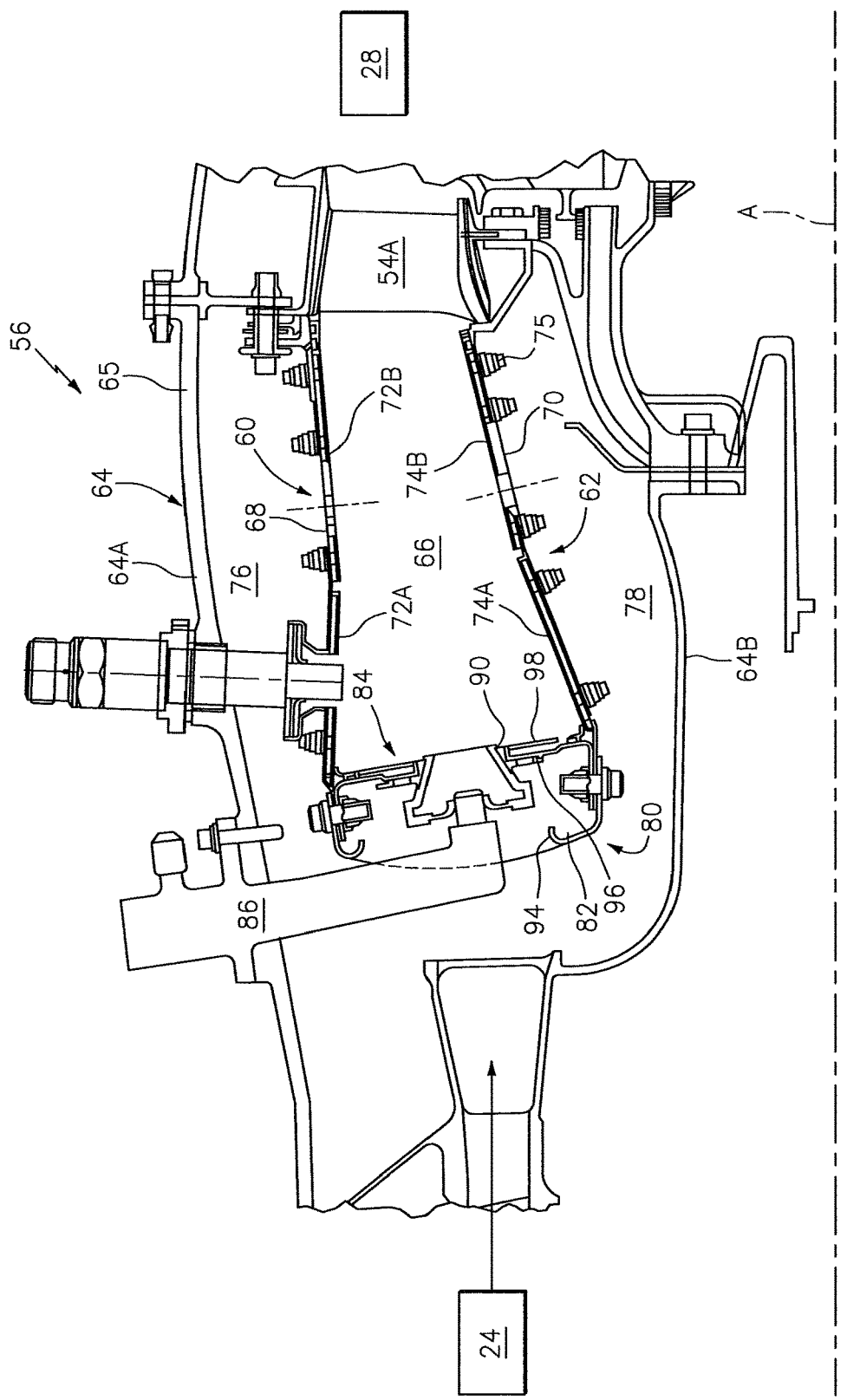
FIG. 3 is an expanded longitudinal schematic sectional view of a combustor section according to one non-limiting embodiment that may be used with the example gas turbine engine architectures shown in FIGS. 1 and 2.

With reference to FIG. 3, the combustor section 26 generally includes a combustor 56 with an outer combustor wall assembly 60, an inner combustor wall assembly 62 and a diffuser case module 64. The outer combustor wall assembly 60 and the inner combustor wall assembly 62 are spaced apart such that a combustion chamber 66 is defined therebetween. The combustion chamber 66 is generally annular in shape to surround the engine central longitudinal axis A.

The outer combustor liner assembly 60 is spaced radially inward from an outer diffuser case 64A of the diffuser case module 64 to define an outer annular plenum 76. The inner combustor liner assembly 62 is spaced radially outward from an inner diffuser case 64B of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72, 74 mounted thereto arranged to form a liner array. It should be appreciated that other single wall shell combustors may alternatively benefit herefrom.

In one disclosed non-limiting embodiment, the support shells 68, 70 may be manufactured by, for example, the hydroforming of a sheet metal alloy to provide the generally cylindrical outer shell 68 and inner shell 70. Each of the liner panels 72, 74 may be generally rectilinear with a circumferential arc. The liner panels 72, 74 may be manufactured of, for example, a nickel based super alloy, ceramic or other temperature resistant material. In one disclosed non-limiting embodiment, the liner array includes a multiple of forward liner panels 72A and a multiple of aft liner panels 72B that are circumferentially staggered to line the outer shell 68. A multiple of forward liner panels 74A and a multiple of aft liner panels 74B are circumferentially staggered to line the inner shell 70.

The combustor 56 further includes a forward assembly 80 immediately downstream of the compressor section 24 to receive compressed airflow therefrom. The forward assembly 80 generally includes a cowl 82, a bulkhead assembly 84, and a multiple of swirlers 90 (one shown). Each of the swirlers 90 is circumferentially aligned with one of a multiple of fuel nozzles 86 (one shown) and the respective hood ports 94 to project through the bulkhead assembly 84.

The bulkhead assembly 84 includes a bulkhead support shell 96 secured to the combustor walls 60, 62, and a multiple of circumferentially distributed bulkhead liner panels 98 secured to the bulkhead support shell 96 around the swirler opening. The bulkhead support shell 96 is generally annular and the multiple of circumferentially distributed bulkhead liner panels 98 are segmented, typically one to each fuel nozzle 86 and swirler 90.

The cowl 82 extends radially between, and is secured to, the forwardmost ends of the combustor walls 60, 62. The cowl 82 includes a multiple of circumferentially distributed hood ports 94 that receive one of the respective multiple of fuel nozzles 86 and facilitates the direction of compressed air into the forward end of the combustion chamber 66 through a swirler opening 92. Each fuel nozzle 86 may be secured to the diffuser case module 64 and project through one of the hood ports 94 and through the swirler opening 92 within the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 4:
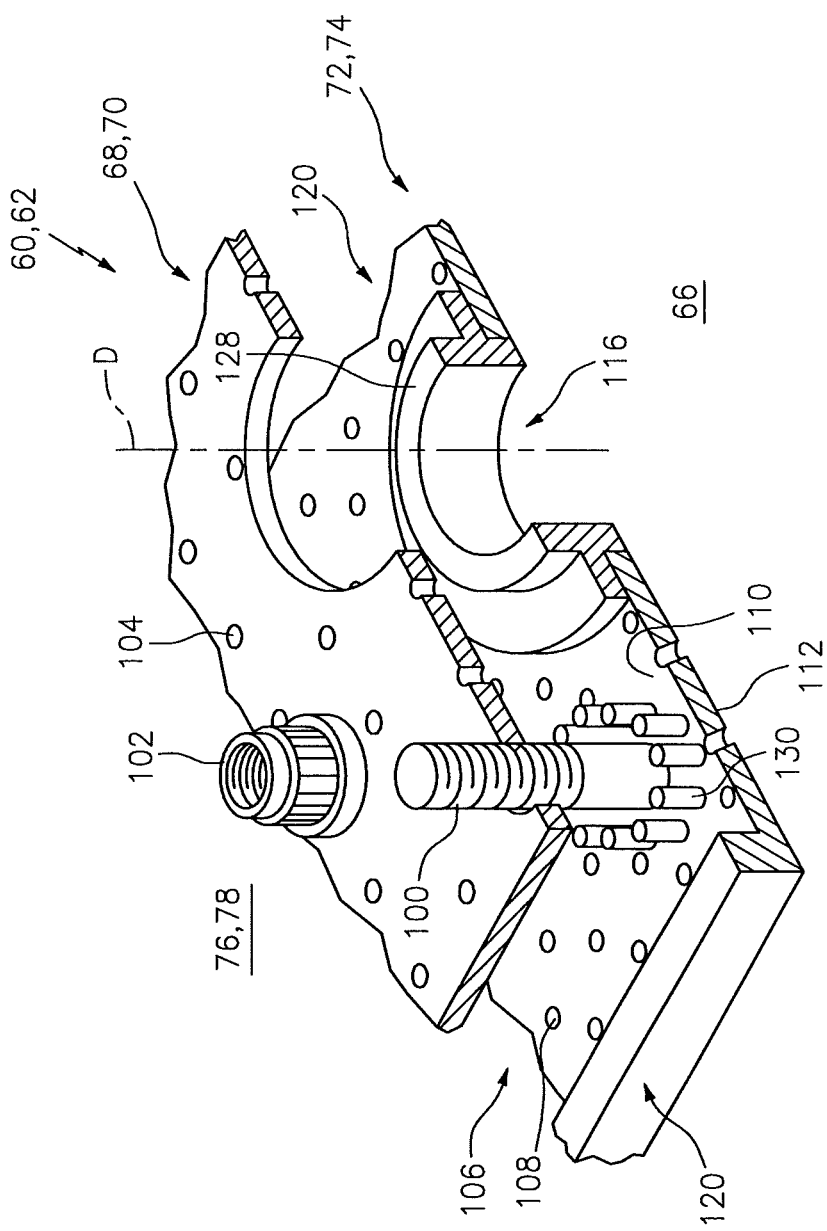
FIG. 4 is an exploded partial sectional view of a portion of a combustor wall assembly.

With reference to FIG. 4, a multiple of studs 100 extend from each of the liner panels 72, 74 so as to permit an array (partially shown in FIG. 5) of the liner panels 72, 74 to be mounted to their respective support shells 68, 70 with fasteners 102 such as nuts. That is, the studs 100 project rigidly from the liner panels 72, 74 to extend through the respective support shells 68, 70 and receive the fasteners 102 on a threaded section thereof.

A multiple of cooling impingement passages 104 penetrate through the support shells 68, 70 to allow air from the respective annular plenums 76, 78 to enter cavities 106 formed in the combustor walls 60, 62 between the respective support shells 68, 70 and liner panels 72, 74. The cooling impingement passages 104 are generally normal to the surface of the liner panels 72, 74. The air in the cavities 106 provide cold side impingement cooling of the liner panels 72, 74 that is generally defined herein as heat removal via internal convection.

A multiple of effusion passages 108 penetrate through each of the liner panels 72, 74. The geometry of the passages 108 (e.g., diameter, shape, density, surface angle, incidence angle, etc.) as well as the location of the passages 108 with respect to the high temperature combustion flow also contributes to effusion film cooling. The effusion passages 108 allow the air to pass from the cavities 106 defined in part by a cold side 110 of the liner panels 72, 74 to a hot side 112 of the liner panels 72, 74 and thereby facilitate the formation of a thin, relatively cool, film of cooling air along the hot side 112. In one disclosed non-limiting embodiment, each of the multiple of effusion passages 108 are typically 0.025" (0.635 mm) in diameter and define a surface angle of about thirty (30) degrees with respect to the cold side 110 of the liner panels 72, 74. The effusion passages 108 are generally more numerous than the impingement passages 104 and promote film cooling along the hot side 112 to sheath the liner panels 72, 74. Film cooling as defined herein is the introduction of a relatively cooler air at one or more discrete locations along a surface exposed to a high temperature environment to protect that surface in the region of the air injection as well as downstream thereof. The combination of impingement passages 104 and effusion passages 108 may be referred to as an Impingement Film Floatwall (IFF) assembly.

A multiple of dilution passages 116 may penetrate through both the respective support shells 68, 70 and liner panels 72, 74 along a common axis D. For example only, the dilution passages 116 are located in a circumferential line W (shown partially in FIG. 5). Although the dilution passages are illustrated in the disclosed non-limiting embodiment as within the aft liner panels 72B, 74B, the dilution passages may alternatively be located in the forward liner panels 72A, 72B or in a single liner panel architecture that replaces the fore/aft illustrated liner panel array.

Figure 5:
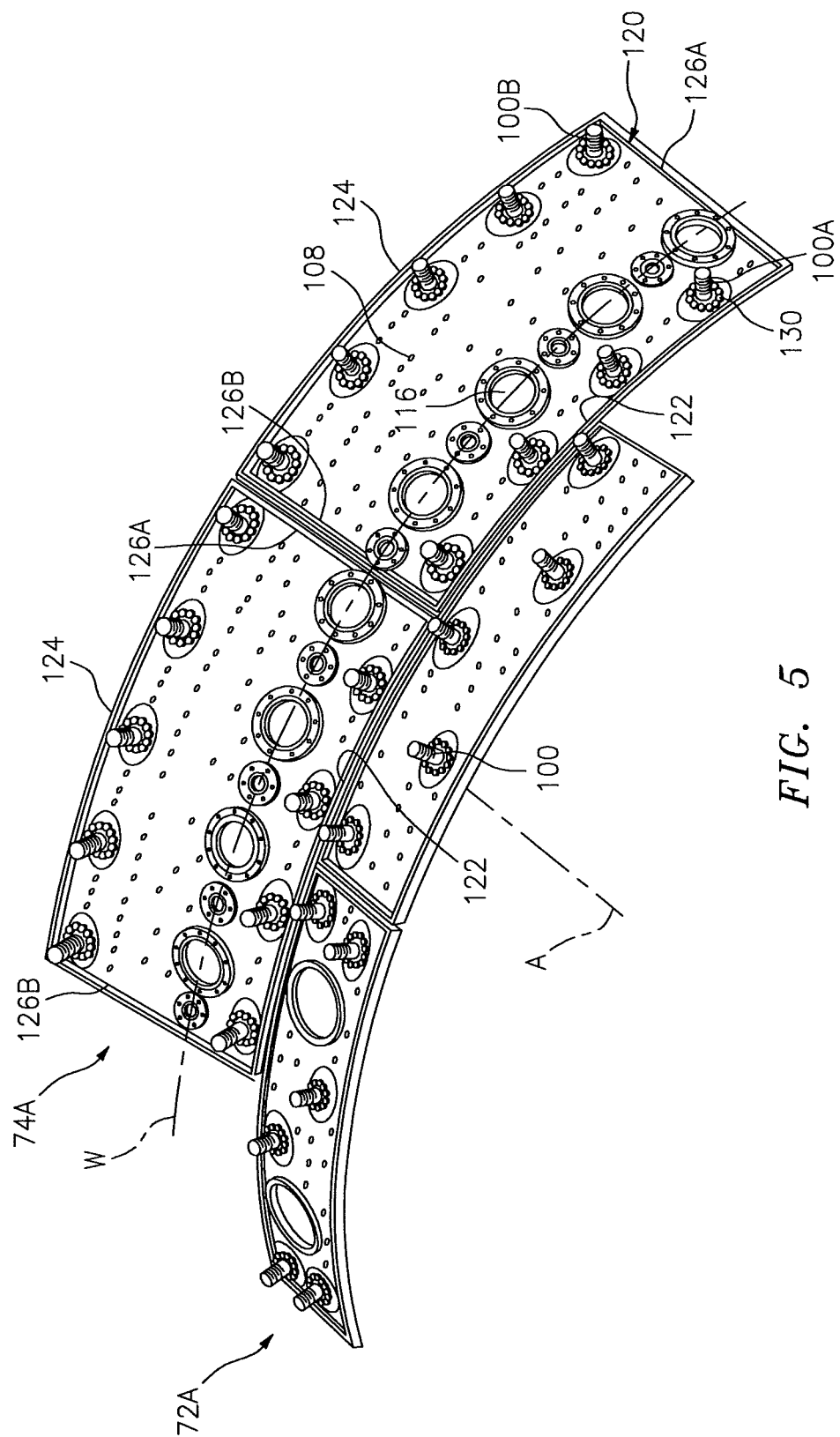
FIG. 5 is a perspective cold side view of a portion of a liner panel array.

With reference to FIG. 5, in one disclosed non-limiting embodiment, each of the aft liner panels 72B, 74B in the liner panel array includes a perimeter rail 120 formed by a forward circumferential rail 122, an aft circumferential rail 124 and axial rails 126A, 126B that interconnect the forward and aft circumferential rail 122, 124. The perimeter rail 120 seals each liner panel 72B, 74B with respect to the support shell 68, 70 to form the impingement cavity 106 therebetween (FIG. 4). That is, the forward and aft circumferential rail 122, 124 are located at relatively constant curvature shell interface while the axial rails 126 extend across an axial length of the respective support shell 68, 70 to complete the perimeter rail 120 that seals the liner panels 72B, 74B to the respective support shell 68, 70.

A row of studs 100A, 100B are located adjacent to the respective forward circumferential rail 122 and aft circumferential rail 124. Each of the studs 100A, 100B may be at least partially surrounded by posts 130 to at least partially support the fastener 102 and provide a stand-off between each liner panels 72B, 74B and respective support shell 68, 70.

In one disclosed non-limiting embodiment, the dilution passages 116 are located downstream of the forward circumferential rail 122 to quench the hot combustion gases within the combustion chamber 66 by direct supply of cooling air from the respective annular plenums 76, 78. That is, the dilution passages 116 pass air at the pressure outside the combustion chamber 66 directly into the combustion chamber 66. This dilution air is not primarily used for cooling of the metal surfaces of the combustor shells or panels, but to condition the combustion products within the combustion chamber 66. In one disclosed non-limiting embodiment, the dilution passages 116 are all of equivalent size (FIG. 6), while in another disclosed non-limiting embodiment, the dilution passages 116 include circumferentially alternating major dilution passages 116A and minor dilution passages 116B (FIG. 7). It should be appreciated that in yet another disclosed non-limiting embodiment, no dilution passages whatsoever are required.

Figure 6:
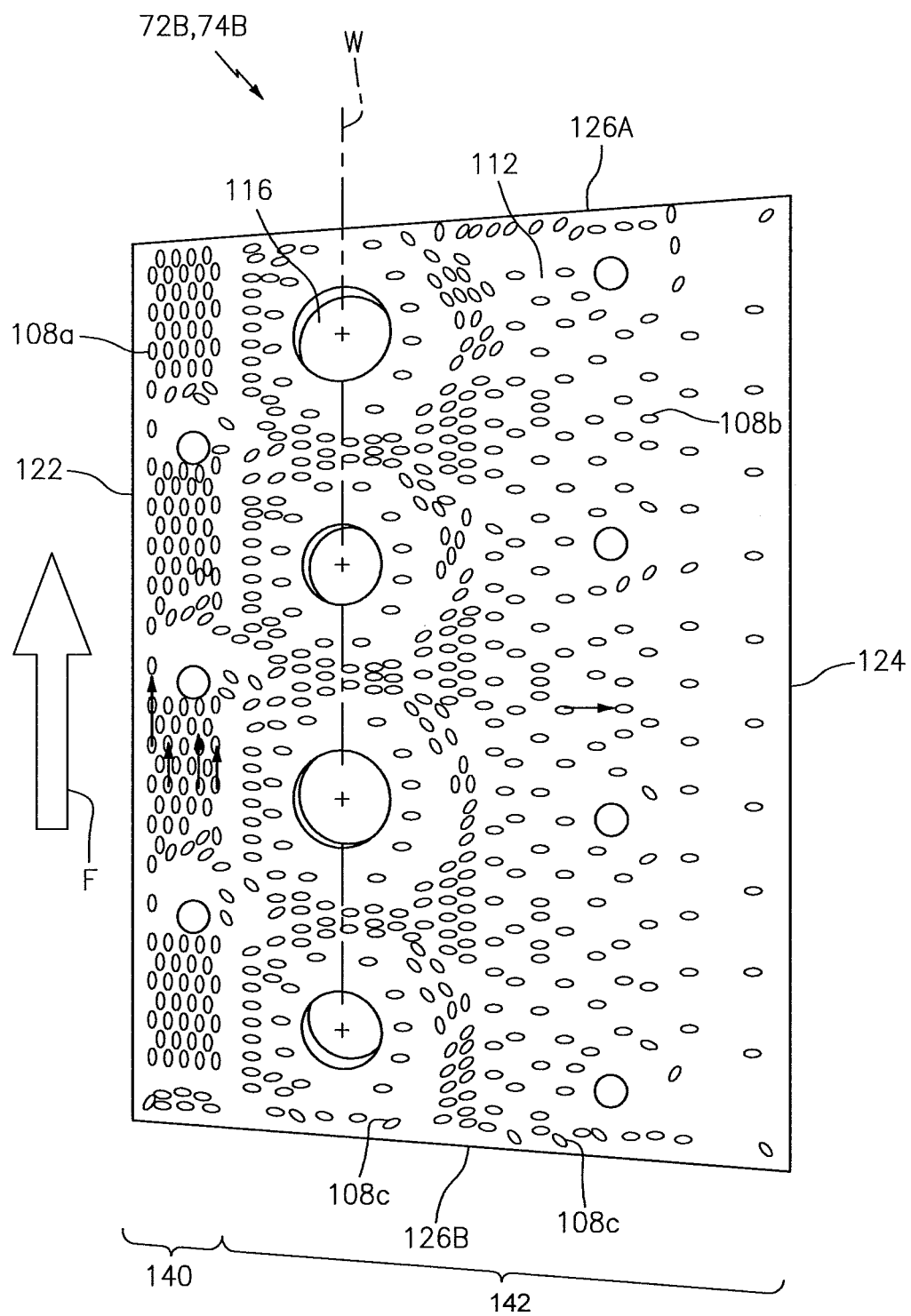
FIG. 6 is a perspective hot side view of an aft liner panel of a combustor wall assembly according to one disclosed non-limiting embodiment.
Figure 7:
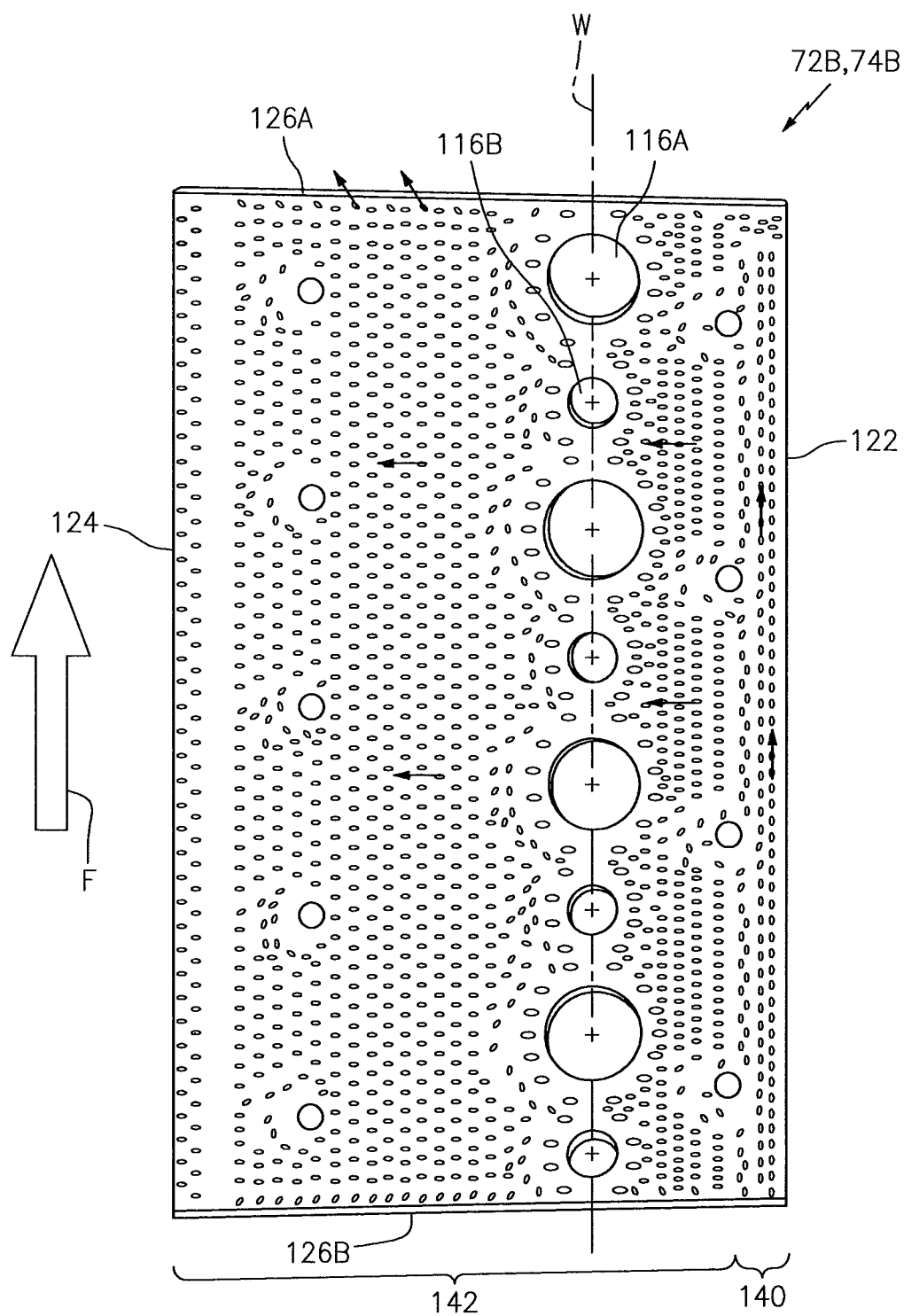
FIG. 7 is a perspective hot side view of an aft liner panel of a combustor wall assembly according to another disclosed non-limiting embodiment.
Figure 8:
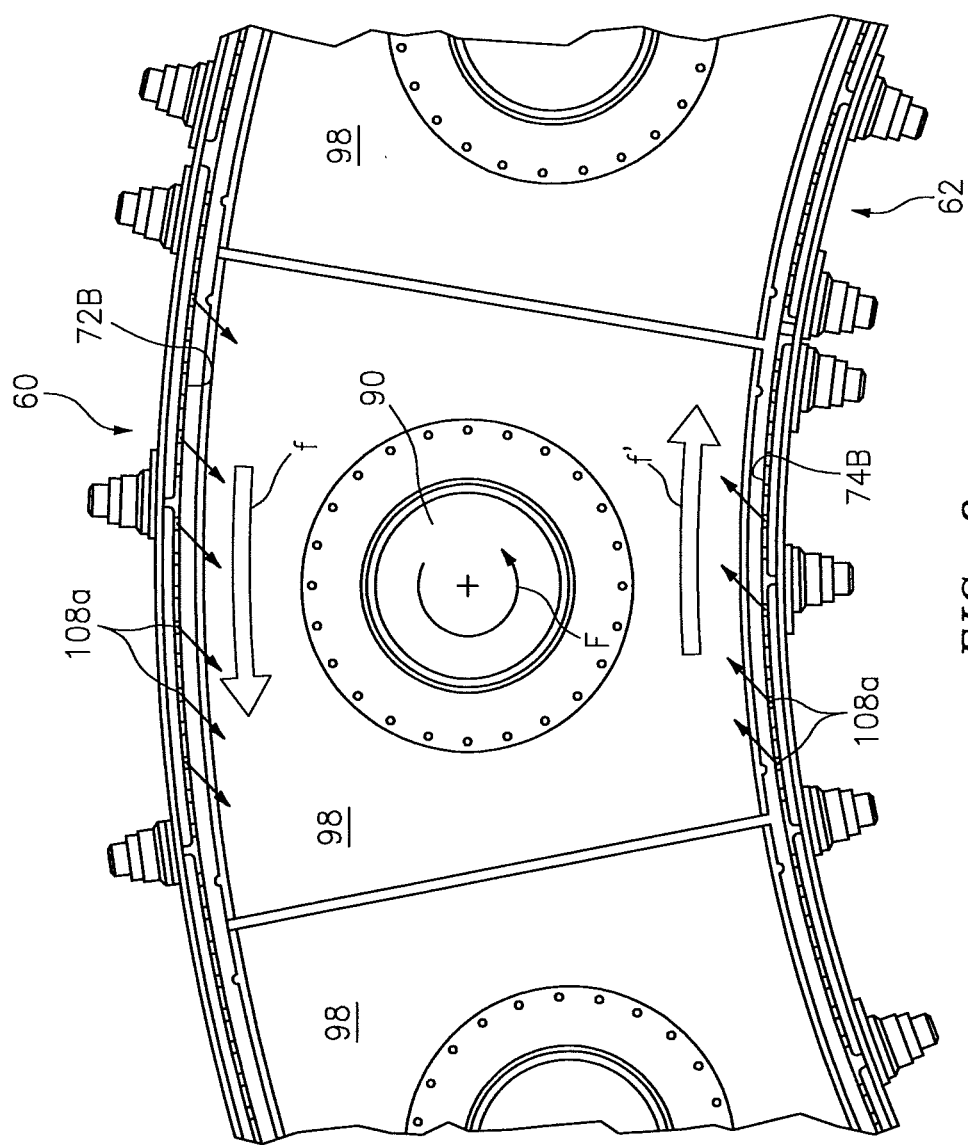
FIG. 8 is an aft looking forward view of a combustor illustrating swirl flows.

With reference to FIG. 6, two particularly relevant regions of each of the aft liner panels 72B, 74B are a forward region 140 forward of the dilution passages 116 and an aft region 142 near and aft of the dilution passages 116. The effusion passages 108a in the forward region 140 have an orientation consistent with the local swirl direction of the combustion gases from the swirler 90 (FIG. 8). Notably, air that emanates from each swirler 90 (illustrated schematically by arrow F; FIG. 8) establishes a local swirl direction in the vicinity of the outer aft liner panels 72B (illustrated schematically by arrow f) that is opposite the local swirl direction in the vicinity of the inner aft liner panels 74B (illustrated schematically by arrow f'; FIG. 8).

The effusion passages 108a in the forward region 140, according to one disclosed non-limiting embodiment, each define a clock angle to be generally parallel to the forward circumferential rail 122, i.e., at about ninety or two-hundred seventy degrees. That is, the predominant direction of the effusion passages 108a in the forward region 140 is circumferential toward the axial rail 126A or 126B in synchronization with the respective counter-clockwise f or the clockwise f' local swirl direction (aft looking forward), respectively (FIG. 8).

The effusion passages 108b in the aft region 142 according to one disclosed non-limiting embodiment define a clock angle to be generally perpendicular to the forward circumferential rail 122; e.g., at about one-hundred eight degrees. That is, the predominant direction of the effusion passages 108b in the aft region 142 is axial toward the aft circumferential rail 124. Any non-axial effusion passages 108c with a clock angle different than the predominant direction in each region 140, 142 may be a singleton; e.g., a single effusion passage rather than a group of passages.

The demarcation between the forward region 140 and the aft region 142, according to one disclosed non-limiting embodiment, is positioned forward of the circumferential line W formed by the dilution passages 116 by about 50%-100% the diameter of the dilution passages 116. In other words, the aft region 142 begins forward of the dilution passages 116 as the swirl that emanates from each swirler 90 tends to straighten axially in the vicinity, and downstream of, the dilution passages 116. The transition of circumferentially directed effusion passages 108a in the forward region 140 to axially directed effusion passages 108b in the aft region 142 thereby generally comports with the change in flow direction along the axial length of the combustion chamber 66. In the absence of any dilution passages 116, as swirl decays along length of combustion chamber 66, the effusion passages are pointed mostly in the downstream direction.

Empirical results show that if the clock angle of the effusion passage aligns with or approximates the mainstream combustion flow direction, favorable conditions are developed in the formation of the cooling film layer on the hot side 112 of the liner panel improve film effectiveness. On the contrary, if the clock angle opposes the mainstream combustion flow direction, the cooling film is likely to be disrupted and stripped away from the surface which may tend to reduce cooling film effectiveness.

The orientation of effusion passage 108c described above may, for example, occur in the vicinity of the axial rails 126A, 126B and the studs 100 so that at least some cooling air flows toward the respective axial rails 126A, 126B and studs 100. These effusion passages 108c with clock angles different than the predominant direction are typically a singleton; e.g., a single passage rather than a group of passages and do not otherwise detract from the predominant clock angle within the regions 140, 142. That is, regions 140,142 with one or more effusion passages 108c at different clock angles still provides the film cooling benefits described.

Direction of the effusion passages 108a, 108b to approximate the mainstream flow direction thereby increases durability life of the combustor and reduces NOx production.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A liner panel for use in a combustor for a gas turbine engine, comprising:

a forward region forward of a dilution passage, the forward region including a multiple of effusion passages each directed at a circumferential orientation relative to an axis of the gas turbine engine;

an aft region aft of the forward region, the aft region including a multiple of effusion passages each directed at an axial orientation relative to the axis; and a forward circumferential rail forward of the forward region, wherein the orientation of the multiple of effusion passages within the forward region is parallel to the forward circumferential rail, and the orientation of the multiple of effusion passages within the aft region is perpendicular to the forward circumferential rail.

2. The liner panel as recited in claim 1, wherein the orientation of the multiple of effusion passages within the forward region is aligned with a local swirl direction of combustion gases.

3. The liner panel as recited in claim 1, wherein the aft region extends forward of the dilution passages by 50%-100% a diameter of the dilution passages.

4. The liner panel as recited in claim 1, further comprising an aft circumferential rail axially downstream of the forward circumferential rail and first and second axial rails that connect the aft circumferential rail with the forward circumferential rail.

5. The liner panel as recited in claim 4, wherein the orientation of at least one of the multiple of effusion passages is directed toward the one of the first and the second axial rails.

6. The liner panel as recited in claim 1, wherein at least one of the multiple of effusion passages within the aft region is a singleton.

7. The liner panel as recited in claim 1, wherein at least one of the multiple of effusion passages within the forward region is a singleton.

* * * * *